US012560680B2

(12) United States Patent     (10) Patent No.:   US 12,560,680 B2

Schoor et al.     (45) Date of Patent:    Feb. 24, 2026

(54) RADAR DEVICE AND METHOD FOR OPERATING A RADAR DEVICE

(71) Applicant: Robert Bosch GmbH, Stuttgart (DE)

(72) Inventors: Michael Schoor, Stuttgart (DE); Christian Hollaender, Waldbronn (DE); Klaus Baur, Mietingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 67 days.

(21) Appl. No.: 17/449,169

(22) Filed: Sep. 28, 2021

(65) Prior Publication Data

US 2022/0107386 A1     Apr. 7, 2022

(30) Foreign Application Priority Data

Oct. 2, 2020    (DE) .......................... 102020212476.0

(51) Int. Cl.
   *G01S 7/03*      (2006.01)
   *G01S 7/35*      (2006.01)
   *G01S 13/34*     (2006.01)
   *G01S 13/931*    (2020.01)

(52) U.S. Cl.
   CPC ............... *G01S 7/03* (2013.01); *G01S 7/354* (2013.01); *G01S 13/347* (2013.01); *G01S 13/931* (2013.01)

(58) Field of Classification Search
   CPC ...................................................... G01S 7/354
   See application file for complete search history.

(56) References Cited

U.S. PATENT DOCUMENTS

| | | | | |
|---|---|---|---|---|
| 5,504,455 A | * | 4/1996 | Inkol | H04L 27/2338 |
| | | | | 329/304 |
| 5,754,123 A | * | 5/1998 | Nashif | G01S 15/86 |
| | | | | 340/436 |
| 7,327,315 B2 | * | 2/2008 | Starkie | H01Q 9/28 |
| | | | | 343/846 |

(Continued)

FOREIGN PATENT DOCUMENTS

| | | |
|---|---|---|
| DE | 102013212090 A1 | 1/2015 |
| DE | 102017206944 A1 | 10/2018 |

(Continued)

OTHER PUBLICATIONS

Bandpassunterabtastung, 2020, pp. 1-3. <https://de.wikipedia.org/w/index.php?title=Ban>.

(Continued)

*Primary Examiner* — Vladimir Magloire
*Assistant Examiner* — Eric K Hodac
(74) *Attorney, Agent, or Firm* — NORTON ROSE FULBRIGHT US LLP

(57) ABSTRACT

A radar device including a transceiver unit and a signal processing unit. The transceiver unit detects a first measuring range including distances from the radar device in a first predefined distance range and outputs first sensor signals. The transceiver unit detects a second measuring range including distances from the radar device in a second predefined distance range and outputs second sensor signals. The signal processing unit evaluates the first and second sensor signals. The first distance range at least partially differs from the second distance range. The distances of the second distance range are greater than a predefined minimum distance.

13 Claims, 3 Drawing Sheets

(56)                    References Cited

U.S. PATENT DOCUMENTS

| | | | |
|---|---|---|---|
| 7,504,988 B2 | 3/2009 | Tsuchihashi et al. | |
| 9,935,664 B1 * | 4/2018 | Dai ..................... | H04B 1/1027 |
| 12,019,137 B2 * | 6/2024 | Welle ................... | G01S 13/878 |
| 2015/0223701 A1 | 8/2015 | Ghaemi et al. | |
| 2018/0329047 A1 | 11/2018 | Wang et al. | |
| 2022/0292296 A1 * | 9/2022 | Hieida ................. | G01S 13/931 |
| 2022/0390554 A1 * | 12/2022 | Murakami ............. | G01S 7/352 |

FOREIGN PATENT DOCUMENTS

| | | | | |
|---|---|---|---|---|
| EP | 1028323 A2 * | 8/2000 | ............ | G01S 13/24 |
| JP | 2001166052 A | 6/2001 | | |
| JP | 2007033155 A | 2/2007 | | |
| JP | 3213332 U | 11/2017 | | |
| KR | 101527772 B1 * | 6/2015 | ............ | G01S 13/34 |
| WO | 2005109033 A1 | 11/2005 | | |
| WO | 2018154747 A1 | 8/2018 | | |

OTHER PUBLICATIONS

Götz, "Einführung in Die Digitale Signalverarbeitung," 2., Überarb. Und Stark Erw. Aufl., B. G. Teubner Stuttgart, 1995, pp. 1-13.

* cited by examiner

Magn/dB

Magn/dB

RADAR DEVICE AND METHOD FOR OPERATING A RADAR DEVICE

CROSS REFERENCE

The present application claims the benefit under 35 U.S.C. § 119 of German Patent Application No. DE 102020212476.0 filed on Oct. 2, 2020, which is expressly incorporated herein by reference in its entirety.

FIELD

The present invention relates to a radar device and a method for operating a radar device. In particular, the present invention relates to a radar device for use in the automotive field.

BACKGROUND INFORMATION

Radar sensors are used in the automotive field to implement comfort functions such as adaptive cruise control and safety functions such as emergency braking assistants. If video cameras are used, the generated camera images first have to be interpreted. In contrast thereto, radar sensors advantageously supply a direct measurement of physical variables.

The radar sensors emit high-frequency radar beams via an antenna structure and receive the beams reflected at objects. The detected objects may be stationary or moving in this case. The distance and the direction, i.e., azimuth and/or elevation angles in relation to the object, may be calculated with the aid of the received radar beams. Moreover, the relative velocity of an object in relation to the radar sensor may be calculated. The typical radar sensors operate in a frequency range between 76 GHz and 81 GHz.

A complete system for implementing comfort and safety functions may include ultrasonic sensors, rear-facing video cameras, stereo video cameras, night vision cameras, and radar sensors of different designs. The radar sensors may be designed, for example, to detect a far range or a medium distance range. A radar sensor for detecting the far range may detect, for example, a distance range up to 250 m. A radar sensor for detecting the medium distance range may detect, for example, a distance range up to approximately 160 m.

The area which is to be monitored with the aid of radar therefore frequently includes the far range including a long reach and reduced angle range, thus a narrow lobe forward. In contrast, the medium range is distinguished by the widest possible detection area, but includes a shorter reach ("360° belt").

Shared or separate antennas may be used to monitor the two ranges. Depending on the design of the sensor, the area of the narrow lobe is generated by modified antenna hardware or by signal processing measures such as digital beamforming. In sensors including many emitting antennas, large amounts of data thus result, however, so that it is advantageous to use various emitting antennas for the various ranges, for example, including separate hardware, TX beam steering, and corresponding arrangement of the emitting antennas.

In FMCW (frequency modulated continuous wave) radar sensors, the emission frequency of a continuous radar signal is modulated in ramps. By mixing the received signal with the emitted signal, a baseband signal is generated which is subsequently evaluated. An exemplary angle-resolving FMCW radar sensor is described in German Patent Application No. DE 10 2013 212 090 A1. In FMCW sensors having fast ramps, a baseband is generated by the homodyne principle, whose frequency is dominated by the distance of the target.

Analog-to-digital converters are typically used, which are designed to sample the frequency range from 0 Hz up to the maximum frequency and convert it into a digital signal, the maximum frequency being determined by the desired maximum distance. To achieve a far range, high sampling rates with resulting large amounts of data are accordingly to be used. Alternatively or additionally, the distance resolution has to be reduced by selection of the ramp lift.

SUMMARY

The present invention provides a radar device and a method for operating a radar device. Preferred specific embodiments of the present invention are disclosed herein.

According to a first aspect, the present invention accordingly relates to a radar device including a transceiver unit and a signal processing unit. In accordance with an example embodiment of the present invention, the transceiver unit detects a first measuring range including distances from the radar device in a first predefined distance range and outputs first sensor signals. Furthermore, the transceiver unit detects a second measuring range including distances from the radar device in a second predefined distance range and outputs second sensor signals. The signal processing unit evaluates the first and second sensor signals. The first distance range at least partially differs from the second distance range. The distances of the second distance range are greater than a predefined minimum distance.

According to a second aspect, the present invention relates to a method for operating a radar device. In accordance with an example embodiment of the present invention, with the aid of the radar device, a first measuring range including distances from the radar device in a first predefined distance range is detected and first sensor signals are output. Furthermore, with the aid of the radar device, a second measuring range including distances from the radar device in a second predefined distance range is detected and second sensor signals are output. The first sensor signals and the second sensor signals are evaluated with the aid of the radar device. The first distance range differs at least partially from the second distance range. The distances of the second distance range are greater than a predefined minimum distance.

The radar device detects two different measuring ranges. The term "measuring range" is to be understood here as a spatial range, i.e., an area monitored with the aid of radar radiation, from which reflections of objects may be detected. The measuring range may be characterized, for example, by a minimum distance, a maximum distance, and a certain angle range. The first measuring range may approximately have the shape of a circular sector, for example, i.e., may be delimited by a circular arc and two circle radii. In general, however, the first measuring range may also have more complicated shapes and may be lobe-shaped, for example. In contrast thereto, at least the second measuring range first begins at a certain minimum distance and extends, for example, up to a maximum distance. For example, the second measuring range may have the shape of a segment of a circular ring, i.e., the part of a circular ring which is enclosed between two circle radii. The second measuring range may also in turn have a more complicated shape, for example, the area of a lobe above the minimum distance.

In sensors including multiple ranges and different emitting antennas, the targets in the overlapping distance range are conventionally "sampled twice." Larger amounts of data are thus recorded than necessary. According to an example embodiment of the present invention, the second measuring range accordingly only includes distances which are greater than a predefined minimum distance. Double sampling is thus avoided or at least reduced.

The present invention thus enables the required amounts of data to be reduced if different detection ranges are used.

According to one refinement of the radar device of the present invention, the second measuring range adjoins the first measuring range. The second measuring range may also partially overlap with the first measuring range. In particular, a greatest distance of the first distance range may essentially correspond to a smallest distance of the second distance range. The measuring ranges may be set accordingly, for example, by adapting filtering and data reduction with respect to the second measuring range, i.e., the far range.

According to one refinement of the radar device of the present invention, the transceiver unit includes a first radar sensor component. The first radar sensor component is designed to detect the first measuring range and output the first sensor signals. Furthermore, the radar device includes a second radar sensor component, which is designed to detect the second measuring range and output the second sensor signals.

The measuring ranges may thus be detected by different radar sensor components or antenna arrangements. These may be separate units including separate antennas. However, the radar sensor components may also include a shared antenna.

According to one refinement of the radar device of the present invention, a distance resolution of the first radar sensor component differs from a distance resolution of the second radar sensor component. This may be achieved, for example, by selecting different frequency deviations in FMCW methods. The first distance range, i.e., the close-up range, may thus be equipped with a very good distance separability, and the second distance range, i.e., the far range, with a worse one. The sampling rates of the ranges may thus also differ, and also the baseband frequencies at which the transition takes place between close-up and far range.

According to one refinement of the radar device of the present invention, the transceiver unit includes a radar sensor component which is operable in a first measuring mode to detect the first measuring range and to output the first sensor signals. Furthermore, the radar sensor component is operable in a second measuring mode to detect the second measuring range and output the second sensor signals. The measuring ranges may thus be detected by the same radar sensor component or antenna arrangement.

According to one refinement of the radar device of the present invention, the transceiver unit includes a bandpass filter which is designed to suppress frequency components from a baseband signal generated by the transceiver unit for detecting the second measuring range which are less than a predefined minimum frequency. The amount of data may be reduced by reducing the baseband signals and the costs of the system may be decreased.

According to one refinement of the radar device of the present invention, the transceiver unit includes an anti-aliasing filter, the anti-aliasing filter including the bandpass filter. The bandpass filter may be used instead of a low-pass filter used in the related art.

According to one refinement of the radar device of the present invention, the predefined minimum frequency is an even-numbered divisor of a maximum frequency of the baseband signal. For example, the predefined minimum frequency may correspond to half of the bandwidth or one-fourth of the bandwidth. Such frequencies may be implemented in a technically easy manner and are distinguished by low power consumption. The use of half the bandwidth is advantageous, for example, insofar as the close-up range covers approximately half of the distance of the far range. For example, the close-up range may cover distances up to approximately 100 m and the far range from approximately 100 m to approximately 200 m.

According to one refinement of the radar device of the present invention, the transceiver unit includes an oversampling analog-to-digital converter which is designed to provide the baseband signal. The radar device furthermore includes a digital decimation filter which includes the bandpass filter and is designed to filter the baseband signal provided by the analog-to-digital converter. The bandpass filter may be integrated easily into a decimation filter.

According to one refinement of the radar device of the present invention, the transceiver unit is furthermore designed to shift frequencies from a baseband signal generated by detecting the second measuring range toward lower frequencies. This corresponds to the effect of a bandpass filtering since low frequencies are cut off.

Figure 1:
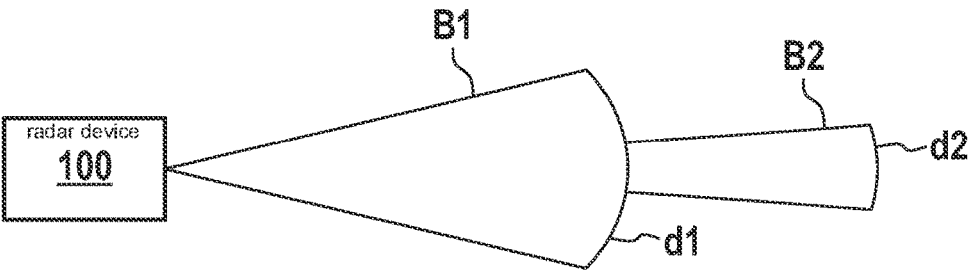
FIG. 1 shows a schematic top view of a radar device according to one specific embodiment of the present invention to explain measuring ranges.

In all figures, identical or functionally identical elements and devices are provided with the same reference numerals. The numbering of method steps is used for clarity and in general is not to imply a specific chronological sequence. In particular, multiple method steps may also be carried out at the same time.

DETAILED DESCRIPTION OF EXAMPLE EMBODIMENTS

FIG. 1 shows a schematic top view of a radar device 100 to explain measuring ranges B1, B2. Radar device 100 is designed to detect both a first measuring range B1 and a second measuring range B2. An angle range of first measuring range B1 is preferably greater than an angle range of second measuring range B2. Furthermore, a maximum distance d1 of first measuring range B1 is less than a maximum distance d2 of second measuring range B2. Furthermore, second measuring range B2 adjoins first measuring range B1, and thus includes distances between maximum distance d1 of first measuring range B1 and maximum distance d2 of second measuring range B2. First measuring range B1 thus corresponds to a close-up range or medium distance range and second measuring range B2 corresponds to a far range.

The present invention is not restricted to the illustrated design of measuring ranges B1 and B2. According to other specific embodiments, second measuring range B2 may also partially overlap with first measuring range B1. Furthermore, a differing shape of the measuring ranges is also possible. In particular, the angle extension of the measuring ranges may also change with the distance.

Figure 2:
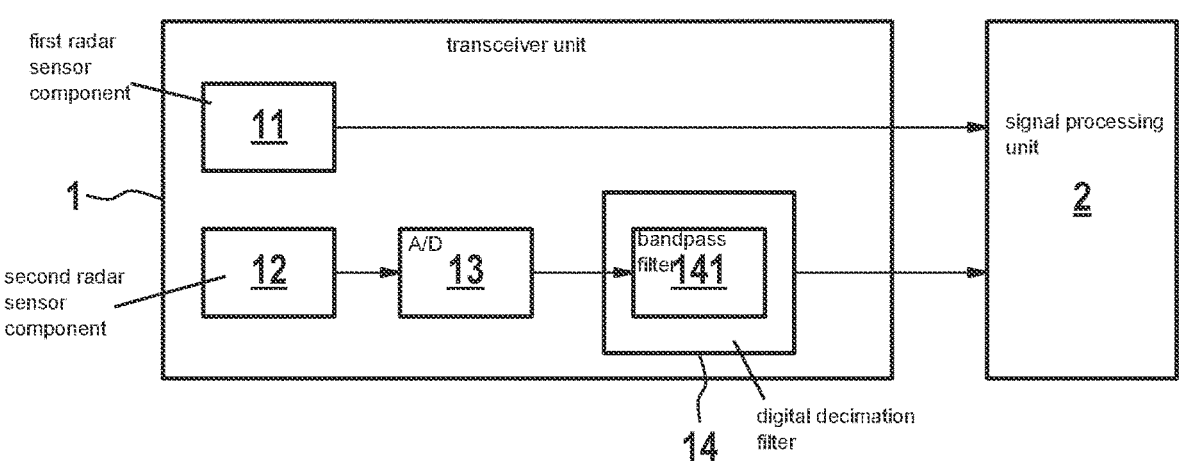
FIG. 2 shows a schematic block diagram of the radar device illustrated in FIG. 1.

FIG. 2 shows a schematic block diagram of radar device 100. The components of radar device 100 may be implemented in an MMIC (monolithic microwave integrated circuit).

Radar device 100 includes a transceiver unit 1, which detects first measuring range B1 shown in FIG. 1 and generates a first sensor signal and detects second measuring range B2 shown in FIG. 1 and generates a second sensor signal. Transceiver unit 1 includes a first radar sensor component 11 including first antenna arrangements for detecting first measuring range B1. Furthermore, transceiver unit 1 includes a second radar sensor component 12 including second antenna arrangements for detecting second measuring range B2. A separate antenna arrangement is accordingly provided for each measuring range.

Transceiver unit 1 includes an oversampling analog-to-digital converter 13 to provide a baseband signal on the basis of the signals emitted and received by second radar sensor component 12. Furthermore, transceiver unit 1 includes a digital decimation filter 14, which includes a bandpass filter 141 and is designed to filter the baseband signal provided by analog-to-digital converter 13. The bandpass filter suppresses frequency components of the baseband signal which are less than a predefined minimum frequency. The predefined minimum frequency is preferably an even-numbered divisor of a maximum frequency of the baseband signal.

An analog-to-digital converter (not shown) for providing a baseband signal and a low-pass filter for filtering the baseband signal may also be provided for first radar sensor component 11. Alternatively, analog-to-digital converter 13 and filter 141 (preferably operated as a low-pass filter for first radar sensor component 11) may also be provided for processing the emission signals generated by first radar sensor component 11. For example, the sensor signals of first radar sensor component 11 and second radar sensor component 12 may be processed alternately.

The distance resolution of first radar sensor component 11 may differ from a distance resolution of second radar sensor component 12. The design of bandpass filter 141 is not linked to the maximum baseband frequency of the close-up range. Rather, the selection of the band limits of the filter, in combination with the frequency deviation, may result in a correspondence of the distance ranges at the corresponding limits.

Furthermore, radar device 100 includes a signal processing unit 2, which evaluates the first sensor signals and the second sensor signals. In particular, signal processing unit 2 may carry out a data fusion of the first sensor signals and the second sensor signals.

However, the present invention is not restricted to this design. In particular, it may also be provided that transceiver unit 1 only includes a single radar sensor component including antenna elements. Transceiver unit 1 is operable in two different measuring modes. In the first measuring mode, first measuring range B1 is detected and in the second measuring mode, second measuring range B2 is detected.

Furthermore, transceiver unit 1 may also include an anti-aliasing filter, the anti-aliasing filter including bandpass filter 141.

Bandpass filter 141 may be implemented in the high-frequency component of the MMIC and preferably in spatial proximity to the analog-to-digital converter. Bandpass filter 141 may be designed as an analog filter before analog-to-digital converter 13 or (as shown in FIG. 2) as a digital filter after analog-to-digital converter 13. If an analog-to-digital converter 141 including oversampling and digital decimation filters is used, new bandpass filter 141 may be integrated easily. A frequency shift may also be integrated in the case of digital filters, so that the aliasing effect does not have to be implicitly used. Such bandpass filters 141 may be implemented easily and cost-effectively using RF CMOS (radio frequency complementary metal-oxide semiconductor) technology.

Finally, transceiver unit 1 may also be designed to shift frequencies of the baseband signal generated to detect second measuring range B2 toward lower frequencies.

Figure 3:
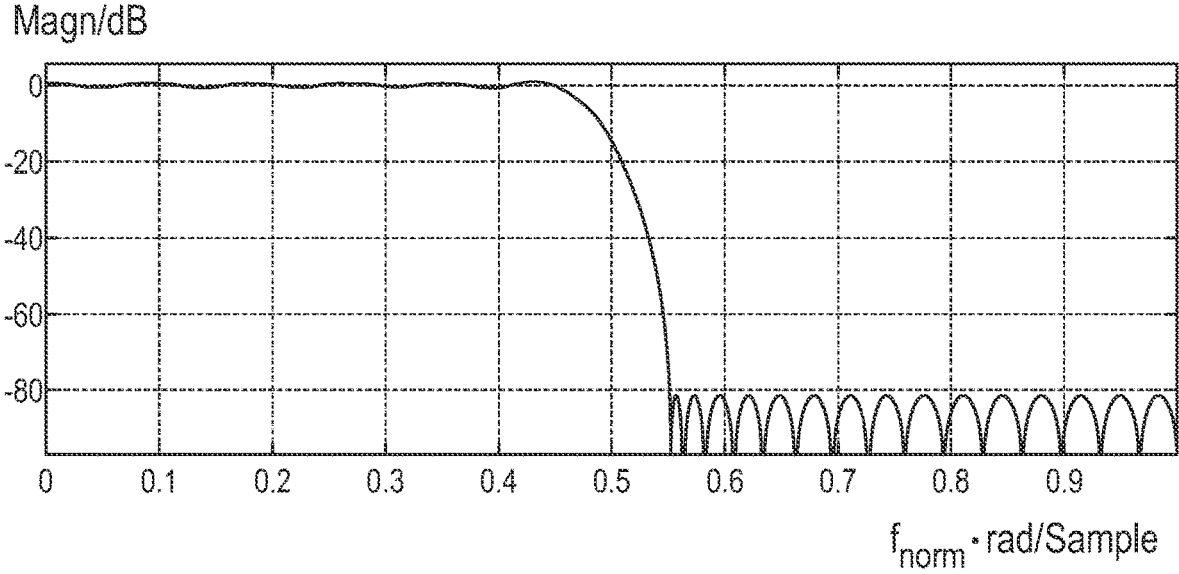
FIG. 3 shows a low-pass filter in the baseband as may be used in the related art, for example.

FIG. 3 shows a typical low-pass filter in the baseband as may be used in the related art, for example. The magnitude (in decibels) is plotted as a function of a normed frequency $f_{norm}$ (in radiant per sample). Small frequencies which correspond to small distances of the object from the radar device are completely detected and taken into consideration further during the following data evaluation. A radar system according to the related art thus samples baseband signals from 0 Hz up to the maximum frequency with the aid of an analog-to-digital converter. A microcontroller has to process and also store all data for a Doppler FFT (fast Fourier transform).

In a real receiving system, the analog-to-digital converter including anti-aliasing filter may be designed in such a way that the sampling rate corresponds to approximately twice the maximum occurring frequency, so that the available and transferred baseband extends from 0 Hz to Fs/2, Fs denoting the sampling frequency. However, due to the real signals, this corresponds to the range from −Fs/2 to Fs/2. In IQ mixers, a single sideband processing may take place so that the baseband effectively extends from 0 Hz to Fs/2. However, due to the required complex-valued numbers, the same amount of data is required.

Figure 4:
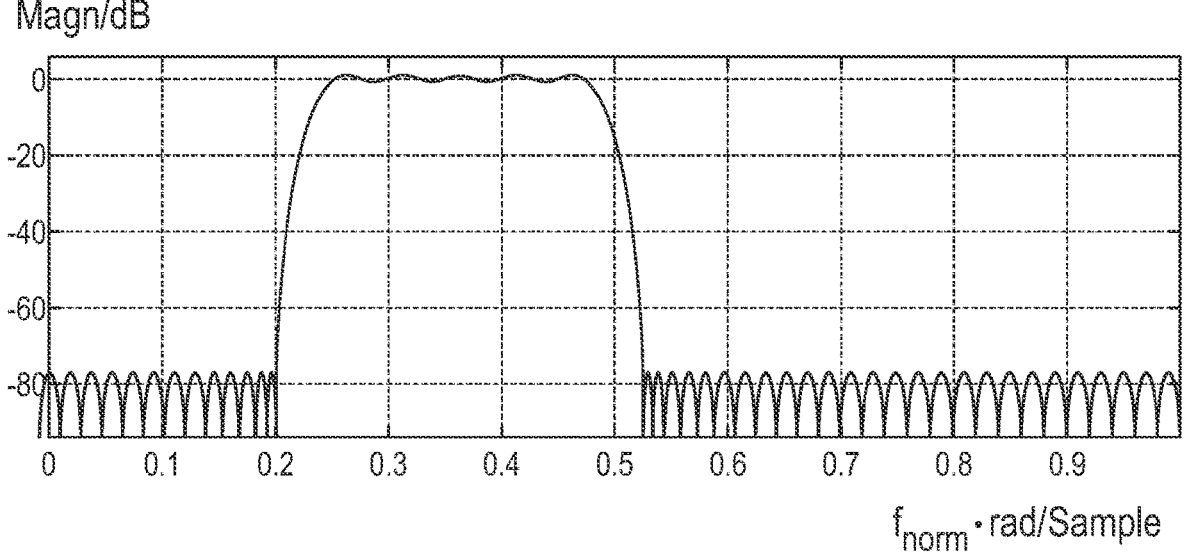
FIG. 4 shows a bandpass filter for use in a radar device according to the present invention.

FIG. 4 shows a bandpass filter for use in a radar device 100 according to the present invention. The filtering in the MMIC takes place in such a way that the entire baseband is no longer sampled and transferred, but only parts of the baseband. One possible embodiment is to only transfer the upper half of the baseband. In IQ systems, this corresponds to the range from Fs/4 to Fs/2. Bandpass filter 141 thus suppresses all signals having a frequency below Fs/4. According to the Nyquist sampling theorem, the sampling rate may thus be reduced. The sampling rate is dependent in this case on the bandwidth of the signals. Higher frequencies may be transformed by aliasing into the lower range, which is unproblematic since the signals located there earlier were suppressed by the filtering.

In real systems, the sampling rate may be reduced after the filtering and the aliasing effect may also be used.

Figure 5:
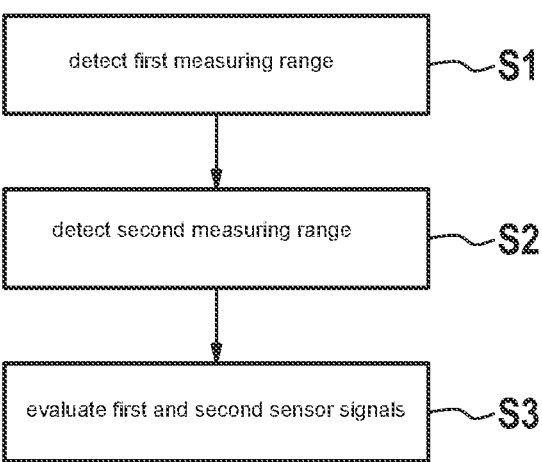
FIG. 5 shows a flowchart of a method for operating a radar device according to one specific embodiment of the present invention.

FIG. 5 shows a flowchart of a method for operating a radar device, in particular above-described radar device 100.

In a first method step S1, a first measuring range B1 including distances from radar device 100 in a first predefined distance range is detected by radar device 100. First sensor signals are output. The first distance range at least partially differs from the second distance range. All distances of the second distance range are greater than a predefined minimum distance.

In a second method step S2, a second measurement range B2 including distances from radar device 100 in a second predefined distance range is detected with the aid of radar device 100. Second sensor signals are output.

In a third method step S3, radar device 100 evaluates the first and second sensor signals. In particular, a data fusion of the first sensor signals and the second sensor signals may be carried out.

What is claimed is:

1. A vehicle comprising a radar device, wherein the radar device comprises:

a transceiver unit configured to:

use at least one of first hardware and a first mode to detect first radar signals in a first measuring range, wherein the first measuring range includes distances from the radar device that are in a first predefined distance range in a first direction from the vehicle;

output first sensor signals corresponding to the detected first radar signals;

use at least one of second hardware and a second mode to detect radar signals in a second measuring range, wherein all distances from the radar device in the second measuring range are within a second predefined distance range in the first direction from the vehicle; and output second sensor signals corresponding to the detected second radar signals; and a signal processing unit configured to evaluate the first sensor signals and the second sensor signals, thereby detecting one or more objects in a surrounding environment of the vehicle;

wherein:

the vehicle is configured to perform at least one of a control function and a safety function based on the detection;

the first distance range at least partially differs from the second distance range;

the transceiver unit includes a bandpass filter, which is configured to suppress, from a baseband signal generated by the transceiver unit to detect the second measuring range, frequency components that are less than a predefined minimum frequency, so that all distances from the radar device in the second measuring range are within a second predefined distance range, such that, when the at least one of the second hardware and the second mode are used, no radar signals corresponding to distances that are not greater than a predefined minimum distance are outputtable by the transceiver unit to the signal processing unit; and the bandpass filter is included, upstream of the signal processing unit, as part of either a digital decimation filter of the transceiver unit or an anti-aliasing filter of the transceiver unit.

2. The radar device as recited in claim 1, wherein the second measuring range adjoins the first measuring range or partially overlaps with the first measuring range.

3. The radar device as recited in claim 1, wherein the transceiver unit includes a first radar sensor component, which is configured to detect the first measuring range and output the first sensor signals, and includes a second radar sensor component, which is configured to detect the second measuring range and output the second sensor signals.

4. The radar device as recited in claim 3, wherein a distance resolution of the first radar sensor component differs from a distance resolution of the second radar sensor component.

5. The radar device as recited in claim 1, wherein the transceiver unit includes a radar sensor component which is operable in a first measuring mode to detect the first measuring range and output the first sensor signals and is operable in a second measuring mode to detect the second measuring range and output the second sensor signals.

6. The radar device as recited in claim 1, wherein the predefined minimum frequency is an even-numbered divisor of a maximum frequency of the baseband signal.

7. The radar device as recited in claim 1, wherein the transceiver unit is configured to shift frequencies from a baseband signal generated to detect the second measuring range toward lower frequencies.

8. The radar device as recited in claim 1, wherein the bandpass filter is included as part of an anti-aliasing filter of the transceiver unit upstream of the signal processing unit.

9. The radar device as recited in claim 1, wherein the bandpass filter is included as part of an anti-aliasing filter of the transceiver unit, upstream of the signal processing unit, so that the bandpass filter contributes to an anti-aliasing function.

10. The radar device as recited in claim 1, wherein the bandpass filter is included as part of a digital decimation filter of the transceiver unit upstream of the signal processing unit.

11. The radar device as recited in claim 10, wherein;

the transceiver unit includes an oversampling analog-to-digital converter, which is configured to provide the baseband signal; and the digital decimation filter is configured to filter the baseband signal provided by the analog-to-digital converter.

12. The radar device as recited in claim 1, wherein the bandpass filter is included as part of a digital decimation filter of the transceiver unit, upstream of the signal processing unit, so that the bandpass filter contributes to suppressing frequency components of the baseband signal that are less than the predefined minimum frequency as part of a decimation process that filters the baseband signal prior to a reduction in sampling rate.

13. A method of a vehicle that includes a radar device, wherein the radar device includes a transceiver unit and a signal processing unit, the method comprising the following steps:

using, by the transceiver unit, at least one of first hardware and a first mode of the radar device to detect first radar signals in a first measuring range, wherein the first measuring range includes distances from the radar device that are in a first predefined distance range in a first direction from the vehicle;

outputting, by the transceiver unit, first sensor signals corresponding to the detected first radar signals;

using, by the transceiver unit, at least one of second hardware and a second mode of the radar device to detect radar signals in a second measuring range, wherein all distances from the radar device in the second measuring range are within a second predefined distance range in the first direction from the vehicle;

outputting, by the transceiver unit, second sensor signals corresponding to the detected second radar signals;

evaluating, by the signal processing unit, the first sensor signals and the second sensor signals, thereby detecting one or more objects in a surrounding environment of the vehicle; and performing at least one of a control function and a safety function based on the detection;

wherein:

the first distance range at least partially differs from the second distance range;

the method includes a bandpass filter of the transceiver unit suppressing, from a baseband signal generated by the transceiver unit to detect the second measuring range, frequency components that are less than a predefined minimum frequency, so that all distances from the radar device in the second measuring range are within a second predefined distance range, such that, when the at least one of the second hardware and the second mode are used, no radar signals corresponding to distances that are not greater than a predefined minimum distance are outputtable by the transceiver unit to the signal processing unit; and the bandpass filter is included, upstream of the signal processing unit, as part of either a digital decimation filter of the transceiver unit or an anti-aliasing filter of the transceiver unit.

\* \* \* \* \*